July 14, 1936.  V. SERICE  2,047,892
ANIMAL TRAP
Filed Dec. 22, 1934    2 Sheets-Sheet 2
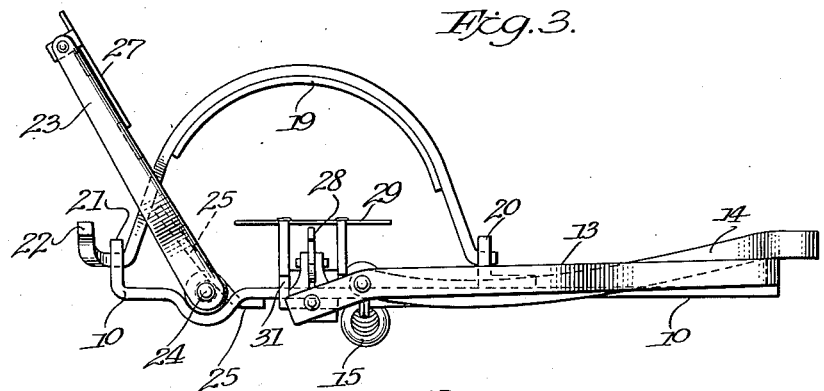
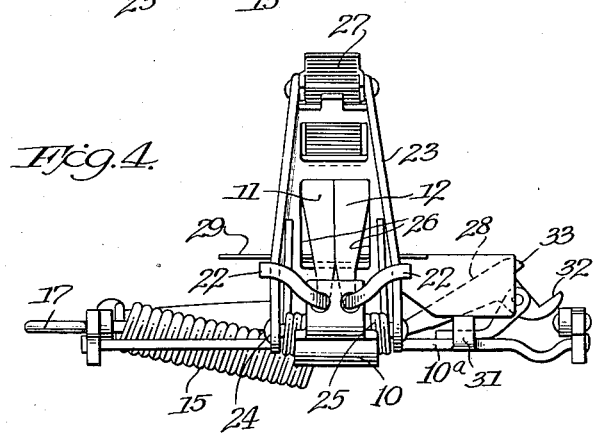
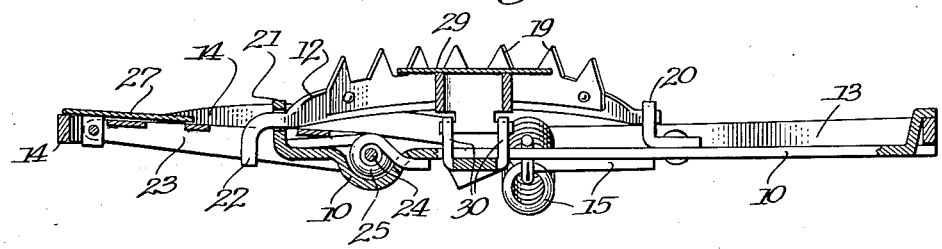
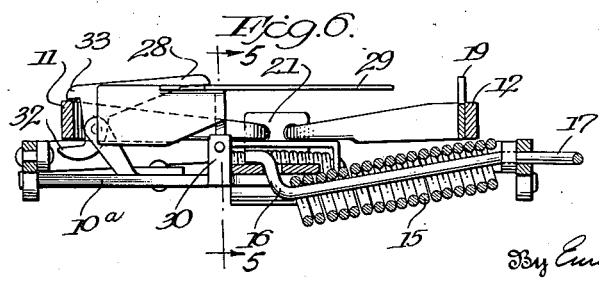
Inventor
Vincent Serice Patented July 14, 1936

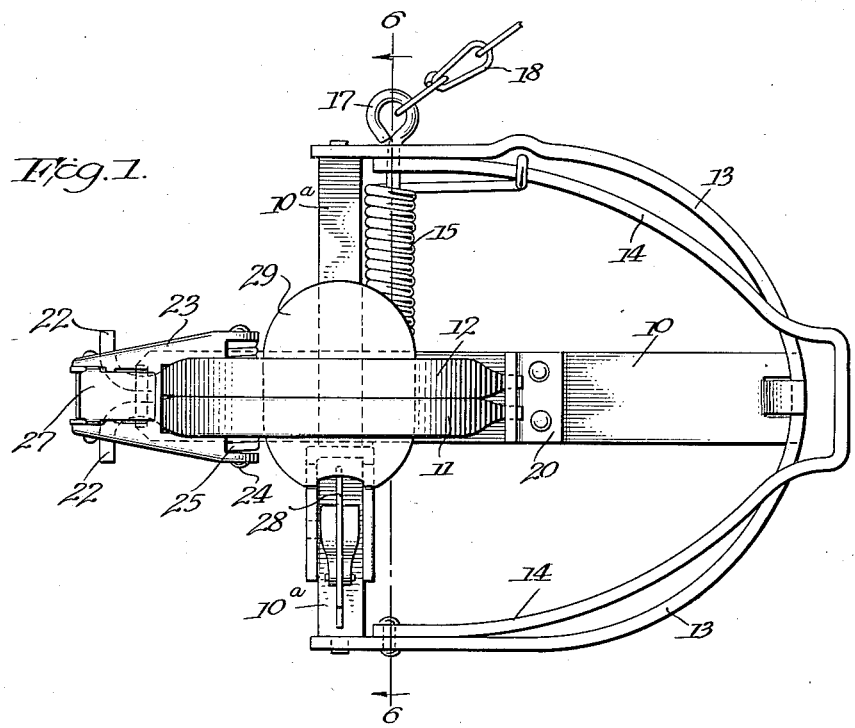
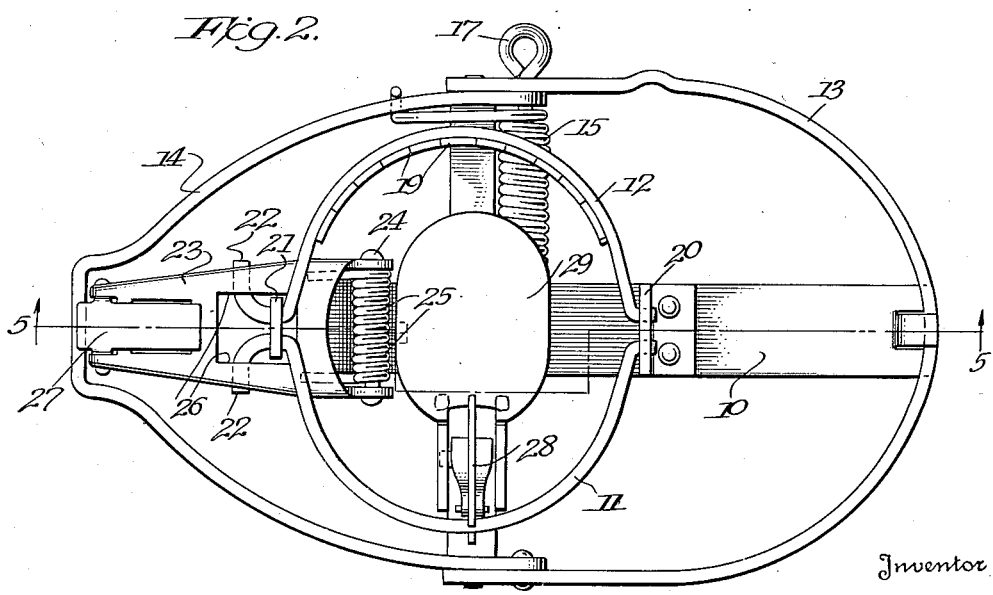

2,047,892

UNITED STATES PATENT OFFICE 2,047,892

ANIMAL TRAP

Vincent Serice, Baldwin, La.

Application December 22, 1934, Serial No. 758,833

12 Claims. (Cl. 43—88)

This invention relates to animal traps of the type having two sets of spring pressed jaws closing from opposite directions at right angles to each other and operating simultaneously when tripped by movement of a single centrally placed contact plate or pan.

The invention aims to improve the design, construction and functioning of traps of this type, and has for its objects to make it easy and safe for the user to set the trap, to insure against escape of the trapped animal, and to simplify the mechanical construction and cheapen the cost.

Further aims and objects of the invention and what it comprises appear in connection with the following description of a trap embodying the invention, illustrated in the accompanying drawings, and in the appended claims.

In the drawings,—

Figs. 1 and 2 are plan views of the illustrative trap in normal sprung position and in set position, respectively;

Figs. 3 and 4 are a side view and an end view, respectively, of the same in normal position; and—

Figs. 5 and 6 are cross-sections of the trap in set positions, Fig. 5 being on the lines 5—5 of Figs. 2 and 6, and Fig. 6 being on the line 6—6 of Fig. 1, respectively, looking in the direction of the arrows.

The trap shown in the drawings has a frame shaped like a cross with the inner jaws 11, 12, pivotally mounted on the central stem 10, and the outer jaws 13, 14, pivotally secured together near the ends of the cross member 10a. One of the outer jaws, 13, is attached at its ends to the ends of the frame cross member and at its mid-point to one end of the central stem of the frame, thereby stiffening the frame.

The two outer jaws are pressed towards each other by a coiled spring 15, embracing the pivot pin 16, which extends inwardly through the fixed jaw 13 and movable jaw 14 and is secured to the central stem of the frame. The outer end of the pivot pin 16 has an eye 17 for attaching a chain 18 or other anchoring or securing means for preventing the trapped animal from carrying the trap away. The inner end of the coiled spring 15 is extended and secured between the inner end of the pivot pin 16 and the frame, and the outer end of the spring is extended and hooked under the movable jaw 14 in set position of the trap (see Fig. 2).

The inner jaws 11, 12, are shaped alike except that they are complementary right and left, and one or both may be provided with a series of teeth 19, shown as attached within the jaw 12. They are each pivoted at one end in holes side by side in a bracket 20 secured to the stem of the frame, and at the other end in similar holes punched through an upright flange 21 bent up at the end of the stem away from the fixed jaw 13. The ends 22 of the jaws 11, 12 project through the flange 21 and are bent upwards and outwards in normal position of the jaws, forming short lever arms for spreading the jaws 11, 12, when the operating bar 23 is depressed. This operating bar is bifurcated to embrace the jaws 11, 12, and is mounted on a pivot pin 24 which in turn is mounted within the coils of the springs 25 which tend to swing the operating bar upwards from its set position. The ends of the coil springs are held by passing them through a hole in the stem of the frame.

The jaws 11, 12, are tapered in width towards one end where they pass between the sides of the operating bar, which has an opening 26 to receive them, as shown in Figs. 2 and 4, and which normally hold them tightly closed by wedge or cam action.

The operating bar 23 has a pivoted gravity actuated latch 27 at its outer end to engage over and hold down the movable outer jaw 14 in set position, as hereinafter described (see Figs. 2 and 5). Thus the operating bar controls the movements of both jaws.

The inner jaws are held open in set position against the pressure of the springs 25 tending to swing the operating bar 23 in the direction to raise the jaws and clamp them shut between the sides of the opening 26. The mechanism for holding the inner jaws in open position includes a pivoted dog 28 and balanced contact pan or trip plate 29, pivoted on ears 30 on the cross bar of the frame, the weight of which normally holds it in horizontal position with its outer bifurcated end resting on a stop 31 on the frame.

The dog 28 is pivoted on the cross member of the frame to swing in a vertical plane between the bifurcations of the contact plate 29, and has two outwardly projecting prongs 32, 33, and an inwardly projecting arm. The lower prong 32 projects under the jaw 11 when it is depressed, and further downward movement raises the inner end of the dog to engage and lift the trip plate 29 until the end of the dog can pass by, whereupon the plate drops back by gravity to the position shown in Fig. 6 and prevents the dog from dropping until the plate is depressed to spring the trap, thus holding the upper prong 33 over the depressed jaw 11 to retain it in set position until the trap is sprung.

To set the trap illustrated in the drawings it is only necessary to grasp the frame 10 from below, as shown in Fig. 3, in one hand and the operating bar 23 in the other, and depress the bar until it strikes the lever arms 22 on the ends of the jaws 11, 12, and opens the jaws out flat, whereupon the jaw 11 will engage the lower prong 32 on the dog 28 and further downward movement will tilt it to raise the inner end of the dog until it lifts the outer end of the contact plate 29 sufficiently to pass above it. Immediately the plate falls by its own weight and its edge passes under the inner end of the dog to hold it in locking position with the upper prong 33 projecting over the jaw 11 to hold it open as shown in Fig. 6. The jaw in turn holds the operating bar 23 in set position until the trap is sprung.

Next, without changing the position of the hand holding the frame part of the trap, with the other hand grasp the large movable jaw 14 and swing it up and over the pivot point and down until it snaps under the gravity operated latch 27, which locks it in open position so long as the operating bar 23 is held down by the inner jaw 11.

Or, if desired, the trap may be set with the two feet and only one hand where hard ground is available to lay it on. Place the trap on the ground in the position illustrated in Figs. 1 and 3, step on the jaws 13 and 14 with one foot and depress the operating bar 23 with the other until the jaws 11, 12, are opened wide and the locking dog 28 and contact plate 29 are set to hold the jaws open. Then place the two feet on the outwardly projecting curved parts of the stationary jaw 13 and grasp the end of the movable jaw 14 with the hand and swing it up and over the pivot point and down until it snaps under the gravity operated latch 27 and is retained thereby. The trap may be picked up by the chain 18 and dragged or carried with safety to the operator, as there is no tendency to spring the trap from bumping its lower edge against the ground or obstacles when suspended by the chain.

When the trap is sprung both sets of jaws are released practically simultaneously, the sudden movement causing the whole trap to jump into the air, and insuring a good hold of the inner jaws on the leg or other part of the animal that sprung it. The jaw and closing spring arrangement of the large set of jaws is such as to seize the animal in a transverse direction to that of the inner jaws so that it is impossible for the animal to work its leg back and forth in the inner jaws to loosen their grip, and working the leg back and forth in the outer jaws is ineffective to loosen the grip of the inner jaws.

In the trap shown in the drawings, the frame, operating parts, and jaws are made of pressed steel with the exception of the springs, which are spring steel wire; and all of the parts are inexpensive to make and readily assembled, and are held in assembled position by riveting, peening or bending and upsetting, no screws or other removable fastening means being employed.

The number of parts is a minimum for the double jaw type of trap, and the shape of the parts is contrived to add to their strength and reduce the weight of the trap for a given size or kind of animal, thus enabling traps embodying the invention to be manufactured and sold at a comparatively low price.

Having described a preferred embodiment of my invention, what I claim and desire to secure by Letters Patent is as follows:

1. An animal trap having two sets of jaws disposed with their axes at right angles, an operating bar for opening and closing one set of jaws, said operating bar carrying an independently movable latch for holding open the other set of jaws, a spring for actuating said operating bar to close said first mentioned jaws, and a separate spring for closing said second set of jaws.

2. An animal trap comprising a frame having a main member and a cross member, inner jaws pivotally mounted on said main member and an outer jaw fixedly connected to said main member at its middle and to the ends of said cross member at its ends, a second outer jaw pivotally connected to said fixed jaw, coil springs for swinging said jaws into closed position, and self latching means pivotally mounted on said main and cross members, respectively, for holding said jaws open against the closing pressure of said springs.

3. An animal trap comprising a frame having a main member and a cross member, inner jaws pivotally mounted on said main member and an outer jaw fixedly connected to said main member at its middle and to the ends of said cross member at its ends, said main member extending beyond the ends of said fixed jaw and having its end provided with means for actuating said inner jaws, a second outer jaw pivotally connected to said fixed jaw, coil springs for swinging said jaws into closed position, and means for holding said jaws open against the closing pressure of said springs, said means including a gravity actuated latch mounted on said cross member and a second gravity actuated latch mounted on said inner jaw actuating means.

4. An animal trap comprising a frame having a main member and a cross member, inner jaws pivotally mounted on said main member and an outer jaw fixedly connected to said main member at its middle and to the ends of said cross member at its ends, a second outer jaw pivotally connected to said fixed jaw, said inner jaw actuating means being provided with a pivoted latch for holding said second outer jaw in set position, coil springs for swinging said jaws into closed position, and means for holding said jaws open against the closing pressure of said springs.

5. An animal trap having two sets of jaws disposed with their axes at right angles, an operating bar for opening and closing one set of jaws, said operating bar carrying a yieldable snap latch for holding open the other set of jaws, a spring for actuating said operating bar to close said first mentioned jaws, and a separate spring for closing said second set of jaws, said operating bar being held in set position by one of said inner jaws, and a trigger held latch for holding said inner jaw in open position.

6. An animal trap having two sets of jaws disposed with their axes at right angles, an operating bar for opening and closing one set of jaws, said operating bar carrying a yieldable snap latch for holding open the other set of jaws, a spring for actuating said operating bar to close said first mentioned jaws, and a separate spring for closing said second set of jaws, said operating bar being held in set position by one of said inner jaws, and a trigger held latch for holding said inner jaw in open position, said trigger held latch having a portion to be engaged by said inner jaw for setting said latch by the opening movement of said jaw.

7. An animal trap having two sets of jaws, an operating bar for opening and closing one set of jaws, said operating bar carrying self-latching means for holding open the other set of jaws, a spring for actuating said operating bar to close said first mentioned jaws, and a separate spring for closing said second set of jaws, said operating bar being held in set position by one of said inner jaws, and a trigger held latch for holding said inner jaw in open position.

8. In an animal trap of the type having two sets of spring pressed jaws closing from opposite directions at right angles to each other, a cross-shape frame for supporting the jaws, a counter weighted contact plate centrally disposed with respect to said frame and jaws, said contact plate being pivotally mounted on said frame at a point intermediate its contact portion and its counter weight portion, a dog pivotally mounted to one side of the pivot point of said contact plate and having an arm overlapping the latter, upper and lower prongs on said dog at the other side of its pivot, said lower prong being engaged by one of said inner jaws in setting the trap to set the dog and contact plate, and said upper prong being adapted to overlie said jaw in set position of the trap to hold the same, and means associated with said jaw for retaining one of the jaws of the other set, whereby depressing said contact plate springs both sets of jaws substantially simultaneously.

9. In an animal trap of the type having two sets of spring pressed jaws closing from opposite directions at right angles to each other, a frame for supporting the jaws, a counter weighted contact plate centrally disposed with respect to said jaws, said contact plate being pivotally mounted on said frame at a point intermediate its contact portion and its counter weight portion, a dog pivotally mounted to one side of the pivot point of said contact plate and having an arm overlapping the latter, a detent on said dog at the other side of its pivot and adapted to overlie one of said jaws in set position of the trap to hold the same, spring pressed means for opening and closing said jaws, said means being held in open position against the pressure of its spring by said jaws when held open by said detent, and yieldable detent means associated with said jaw opening and closing means for retaining one of the jaws of the other set, whereby depressing said contact plate springs both sets of jaws substantially simultaneously.

10. In an animal trap of the type having two sets of spring pressed jaws closing from opposite directions at right angles to each other, a cross-shape frame for supporting the jaws, a counter weighted contact plate centrally disposed with respect to said frame and jaws, said contact plate being pivotally mounted on said frame at a point intermediate its contact portion and its counter weight portion, a dog pivotally mounted to one side of the pivot point of said contact plate and having an arm overlapping the latter, upper and lower prongs on said dog at the other side of its pivot and adapted to overlie and underlie one of said jaws in set position of the trap to hold the same, the lower prong being engaged by said jaw in opening to tilt the dog and raise the arm to displace the contact plate against the action of gravity, and upon resuming its normal position after said arm has passed by its edge, said contact plate operates to prevent said arm from lowering to permit the dog to tilt back to release said jaw, and an operating lever pivoted to said frame and having an intermediate portion adapted to open said jaws and a yieldable snap latch at its free end to engage and hold in open position a jaw of the other set, said operating lever being retained in jaw holding position by said first set of jaws when in open position.

11. A double jaw trap of the type having two sets of spring pressed jaws closing from opposite directions at right angles to each other, one set of jaws being inside of the other, coil springs for operating said jaws and tending to hold them closed, a plurality of gravity operated detents, one for each set of jaws, for holding said jaws open, and a gravity operated contact plate retaining one of said detents for springing said trap, said detents and plates being set automatically by the opening movement of said sets of jaws.

12. A double jaw trap of the type having two sets of spring actuated jaws closing from opposite directions at right angles to each other, an operating bar for opening and closing one set of jaws, said operating bar carrying a yieldable snap latch for holding open the other set of jaws, a detent for holding open the first set of jaws, said first set of jaws when open retaining said operating bar in latching position, and trigger means to hold said detent in position to hold open the first set of jaws, whereby movement of said trigger means to release said detent springs both sets of jaws.

VINCENT SERICE.